Patented Sept. 6, 1932

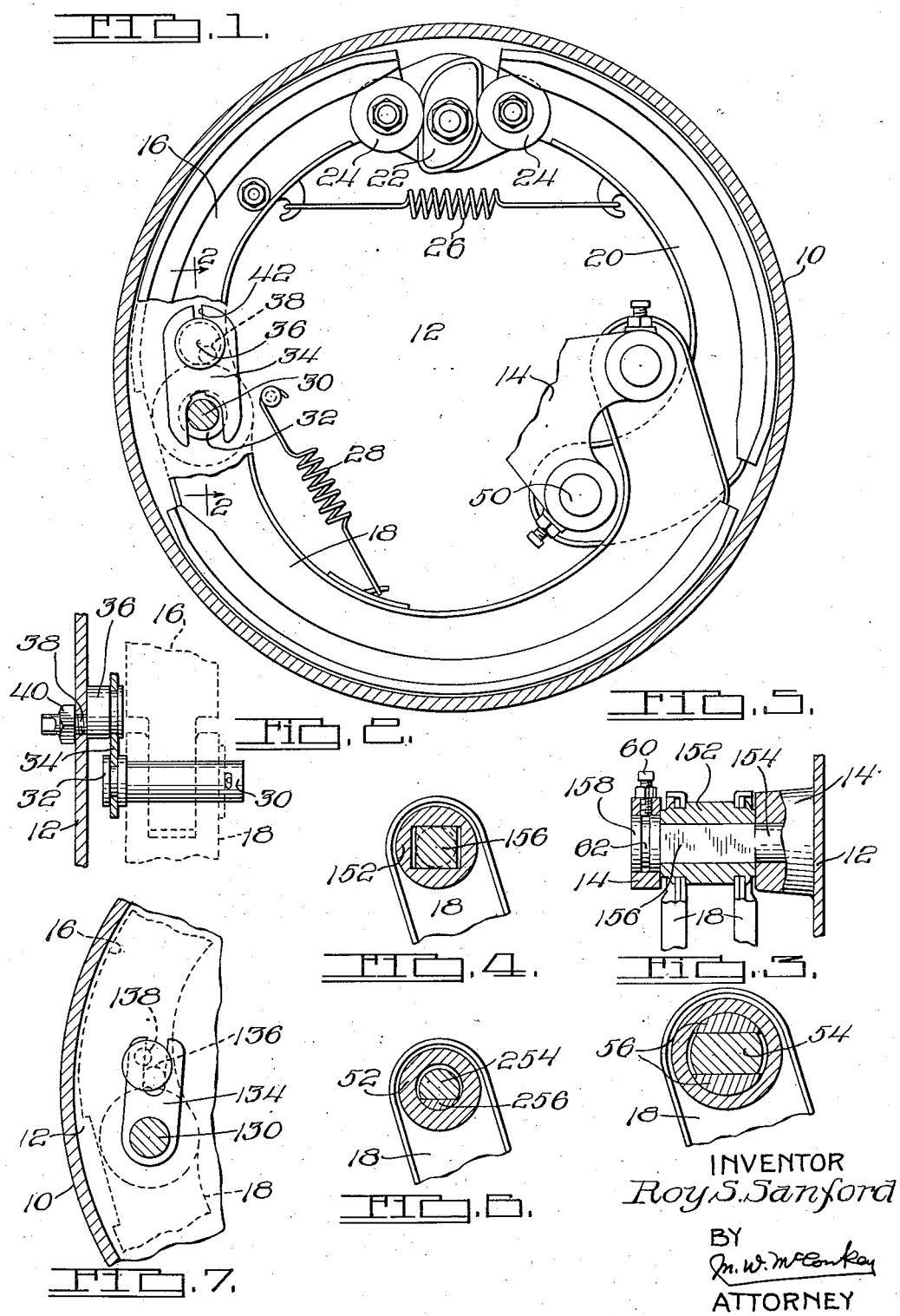

1,876,349

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE

Application filed April 6, 1928. Serial No. 267,859.

This invention relates to brakes, and is illustrated as embodied in an internal expanding automobile brake.

One important feature of the invention relates to providing a guide, preferably automatic in its action, for a portion of the brake friction means,—for example for the connected ends of the primary and secondary shoes of a three shoe brake. Preferably the guide includes two members, one of which is slotted or otherwise formed circumferentially of the drum to embrace or engage the other. The slotted member may be frictionally clamped, or otherwise held, so that it will adjust its position automatically, and in one arrangement is mounted on the head of an adjustable eccentric.

Another feature relates to providing a radially-slidable anchorage or pivot for a brake shoe or the like, so that the shoe may adjust its position to conform to the drum, no matter how much the brake lining may be worn. In one arrangement, there is one or a pair of plano-convex members fitting within the bearing of the shoe and slidably engaging substantially plane surfaces on the anchor or pivot.

The above and other objects and features of the invention, including various novel and desirable details of construction, will be apparent from the following description of the illustrative embodiments shown in the accompanying drawing, in which:

Figure 1 is a vertical section through the brake, just inside the head of the brake drum, and showing the brake shoes in side elevation but partly broken away;

Figure 2 is a partial section on the line 2—2 of Figure 1, showing the means for guiding the connected ends of the primary and secondary shoes;

Figure 3 is a section through the anchor pivot at the end of one of the anchored shoes;

Figure 4 is a similar section showing a modified pivot arrangement;

Figure 5 is a section through the pivot of Figure 4, at right angles to Figure 4;

Figure 6 is a section corresponding to Figures 3 and 4, but showing a third pivot arrangement and Figure 7 is a fragmentary view corresponding to Figure 1 but showing a modified guiding arrangement.

In the arrangement illustrated, the brake includes a rotatable drum 10, at the open side of which is a support such as a backing plate 12, and within which there may also be, if desired, an auxiliary anchor support 14. The friction means of the brake preferably includes a floating primary shoe 16 connected by a novel pivot arrangement to an anchored secondary shoe 18, together with an anchored auxiliary shoe 20. The brake is applied by means such as a double cam 22 acting on rollers 24 on the shoe ends, and operating against the resistance of a return spring 26. Shoe 16 applies shoe 18 against the resistance of an auxiliary return spring 28. The general organization of the brake is more fully described in Patent No. 1,628,957 granted Bendix Brake Company on May 17, 1927, upon the application of A. Y. Dodge.

In the arrangement of Figures 1 and 2, a floating pivot 30 connecting shoes 16 and 18 serves as a guide member for these shoes, preferably being formed with a grooved head 32 straddled by the arms of a normally-stationary guide member 34, these arms serving to form a slot or an equivalent surface extending generally circumferentially or along a chord of the drum and embracing the grooved head 32.

Member 34 has at its end an opening embracing a grooved eccentric 36 having a threaded stem 38 extending through the backing plate 12 and held by a clamp nut 40. The opening in member 34 embracing eccentric 36 is originally slightly smaller than the eccentric and member 34 is slotted at 42, so that member 34 tightly but frictionally grips the eccentric and can be shifted only when considerable force is applied.

It will be seen that turning the eccentric will shift member 34 vertically, to adjust the position of the upper end of the slot which engages the pivot 30, while member 34 can be automatically shifted angularly by pivot 30 in applying the brake to adjust its lateral position. The slot in member 34 which embraces head 32 is wider than the diameter at the bottom of the groove by an amount equal to the desired movement of pivot 30 in releasing the brake. Thus the application of the brake automatically shifts the frictionally-held member 34 to set it to serve as a stop which predetermines the released position of shoe 18 and of the lower end of shoe 16.

In Figure 7, the pivot 130 connecting the shoes is formed with an elongated head 134 forked to form a slot embracing an eccentric 136 formed by a groove in a member having a threaded stem 138 secured by a nut to the backing plate as described above. In this case the slot closely embraces the eccentric pin 136, no clearance for release movement being provided for the reason that the slot extends in the direction of applying movement of pivot 130, so that the only function of head 134 is to serve as a stop having the bottom of the slot engage the adjustably-fixed part 136 when the brake is released. There is no objection to permitting pivot 130 and head 134 to turn freely angularly, to follow any inaccuracies in the guiding interengagement of head 134 and eccentric 136. The arrangement of Figure 7 has previously been disclosed in my application No. 85,962, filed February 4, 1926, and as to this subject-matter the present application is a continuation of my earlier application.

Shoe 18 (and also shoe 20 if desired) is preferably arranged to have a slight radial movement at its anchored end, to compensate for wear or inaccurate adjustment of the brake lining surface at that end of the shoe. It is shown as having spaced anchoring arms straddling the end of shoe 20 and anchored as shown in Figure 3. Shoe 20 is shown anchored on a pivot 50, which may be a simple pivot or may be the same as shown in Figure 3.

In the arrangement of Figure 3, shoe 18 is formed at its end with a cylindrical bearing formed in a separately-formed bushing 52 permanently secured to the end of the shoe and which embraces an anchor pivot 54 which is slightly smaller in diameter than the bearing in bushing 52, and which has approximately parallel and substantially plane surfaces on its opposite sides extending generally radially of the drum and perpendicular to the direction of thrust from the brake shoe. Two plano-convex members 56 are arranged with their curved surfaces fitting the inside of the bearing in bushing 52 and with their plane surfaces slidably engaging the plane surfaces on the anchor pivot 54.

Thus the anchored end of the shoe can shift slightly in a direction perpendicular to the thrust of the braking torque, so that the shoe may adjust its position automatically for full engagement with the drum, although the braking torque has no wedging action tending to shift the shoe. Spring 28 is inclined in a direction to urge the anchored end of the shoe inward away from the drum.

In the arrangement of Figures 4 and 5, bushing 152 has a rectangular opening slidably embracing a squared portion 156 of an anchor pivot having a cylindrical end 154 smaller than portion 156 and received in one part of support 14, and having an enlarged cylindrical end or head 158 journaled in another portion of support 14 and held axially by a setscrew or other key 60 extending into a groove 62.

In Figure 6, the anchor pivot 254 has only one plane surface and one plano-convex segment 256.

The subject matter disclosed and described in connection with Figures 3, 4, 5 and 6 forms the subject matter of a divisional application, Serial No. 619,999, filed June 29, 1932.

While several illustrative embodiments have been described in detail, it is not my intention to limit the scope of the invention to those particular embodiments, or otherwise than by the terms of the appended claims.

I claim:

1. A brake comprising, in combination, a drum, a friction device having a movable part slotted generally along a chord of the drum, and a stationary guide embraced by the slotted part.

2. A brake comprising, in combination, a drum, a friction device having a movable part with a guide surface extending generally along a chord of the drum, and a stationary guide engaging said surface.

3. A brake comprising, in combination, a drum, friction means, and a stationary support, said means and said support having cooperating guide members, one of which is provided with a slot extending generally circumferentially of the drum and which slot embraces a part of the other member.

4. A brake comprising, in combination, a drum, friction means, a stationary support, said means and said support having cooperating guide members, one of which is provided with a slot extending generally circumferentially of the drum and which slot embraces a part of the other member, the slotted member being shiftable by the said part of the other member to adjusted position by the operation of applying the brake.

5. A brake comprising, in combination, a drum, friction means, a stationary support, said means and said support having co-operating guide members, one of which is provided with a slot extending generally circumferentially of the drum and which slot embraces a part of the other member, the slotted member being shiftable by the said part of the other member to adjusted position by the operation of applying the brake, together with means for holding the slotted member in adjusted position.

6. A brake comprising, in combination, a drum, friction means, a stationary support, said means and said support having co-operating guide members, one of which is provided with a slot extending generally circumferentially of the drum and which slot embraces a part of the other member, the slotted member being shiftable by the said part of the other member to adjusted position by the operation of applying the brake, together with means for frictionally clamping the slotted member in adjusted position.

7. A brake comprising, in combination, a drum, friction means, and a stationary support, said means and said support having co-operating guide members, one of which is provided with a slot extending generally circumferentially of the drum and which slot embraces a part of the other member, one of said members having a part serving as a floating pivot connecting two parts of the friction means.

8. An adjusting device comprising in combination, an eccentric having a grooved head and a threaded stem, and a positioning member having an opening embracing said head.

9. An adjusting device comprising, in combination, an eccentric having a head and a threaded stem, and a positioning member having an opening frictionally gripping said head.

In testimony whereof, I have hereunto signed my name.

ROY S. SANFORD.